Sept. 1, 1953 R. J. PIERCE 2,650,374
CAR BED AND PLAYPEN FOR CHILDREN
Filed Jan. 20, 1950 2 Sheets-Sheet 1

Richard J. Pierce
INVENTOR.

BY *Clarence A. O'Brien*
*and Harvey B. Jackson*
Attorneys

Sept. 1, 1953            R. J. PIERCE            2,650,374
CAR BED AND PLAYPEN FOR CHILDREN
Filed Jan. 20, 1950            2 Sheets-Sheet 2
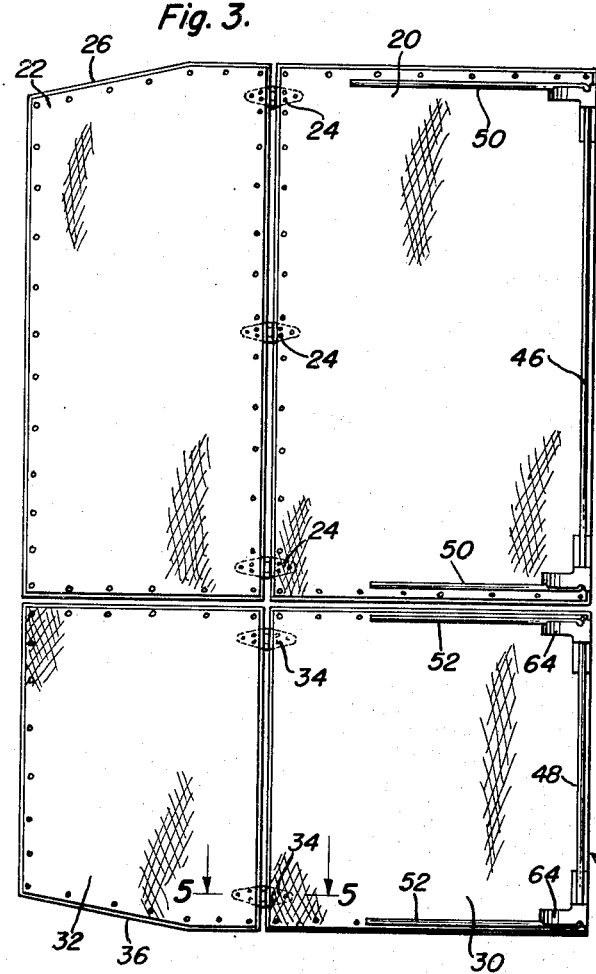
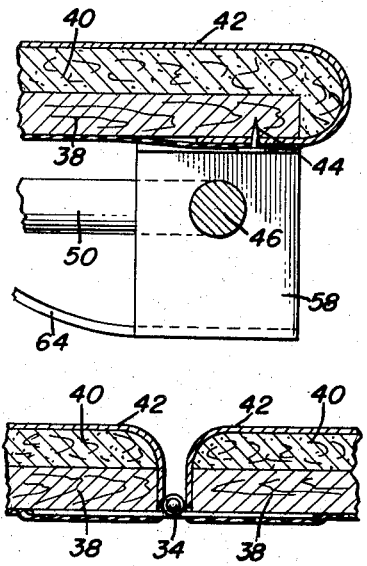
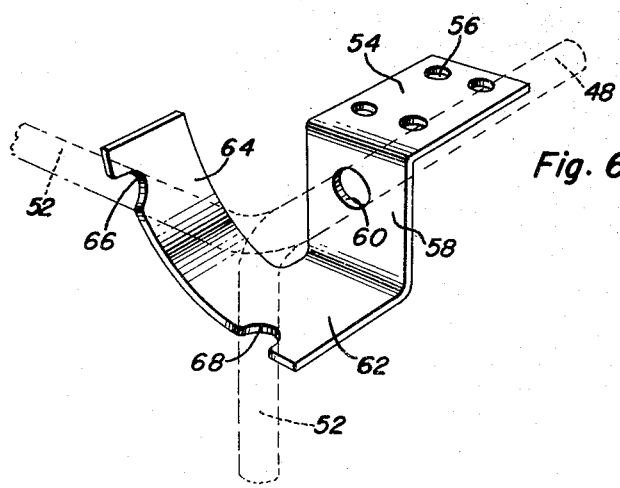
Richard J. Pierce
INVENTOR.
BY *Clarence A. O'Brien*
*and Harvey B. Jacobson*
Attorneys Patented Sept. 1, 1953

2,650,374

UNITED STATES PATENT OFFICE 2,650,374

CAR BED AND PLAYPEN FOR CHILDREN

Richard J. Pierce, Bellflower, Calif.

Application January 20, 1950, Serial No. 139,673

5 Claims. (Cl. 5—94)

This invention comprises novel and useful improvements in a car bed and play pen for children and more specifically pertains to an improved folding platform which may be selectively supported in a horizontal position in the space between the front and rear seats of an automotive vehicle to form a bed or play pen for children, and for covering a predetermined portion of or the entire width of this space in the motor vehicle.

A further important object of the invention is to provide an improved folding bed for automotive vehicles which shall have an improved support for the same; together with an improved means for storing the folded bed in a convenient and unobtrusive manner.

A very important feature of the invention resides in the provision of a folding bed and play pen for automobiles having transversely hinged front and rear sections for disposition between the front and rear seats of an automotive vehicle, together with an improved leg and leg locking means for supporting one of the sections.

Still another important object of the invention resides in the provision of an improved folding bed construction adapted to provide a horizontal platform of various widths in a motor vehicle between the front and rear seats of the same.

These, together with various ancillary features and objects of the invention which will later become apparent as the following description proceeds, are attained by the present invention, a preferred embodiment of which has been illustrated by way of example only in the accompanying drawings, wherein:

Figure 3 is a bottom plan view of the play pen in its erected position;

Figure 4 is a vertical sectional detail view through one corner of the play pen showing the manner in which one of the legs is secured to the play pen;

Figure 5 is a vertical transverse sectional view taken substantially upon the plane indicated by the section line 5—5 of Figure 3 and illustrating the manner in which two sections of the play pen are hinged to each other; and, Figure 6 is a perspective view of a leg mounting bracket, and locking means, indicating in dotted lines therein the alternative positions of a portion of a supporting leg in its erected and in its collapsed position.

Figure 1:
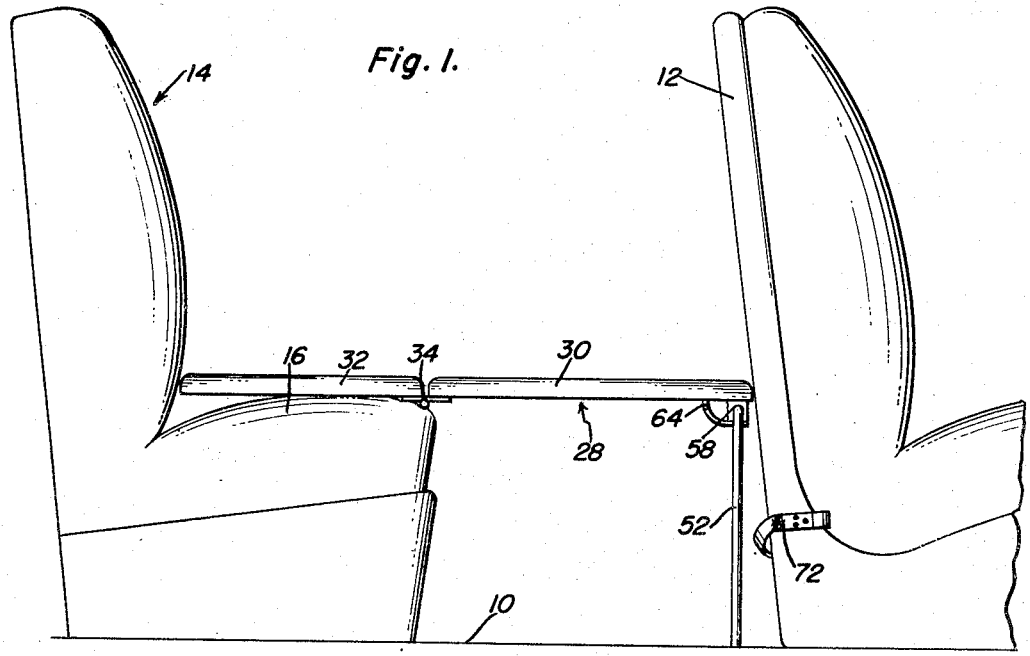
Figure 1 is a side elevational view showing the folding bed and play pen in its erected position in a motor vehicle.

Referring now more specifically to the accompanying drawings, it will be seen from Figure 1 that there has been illustrated a portion of an automotive vehicle including a floor board 10, a front seat 12, and a back seat 14, the latter having the usual seat cushions 16.

Figure 2:
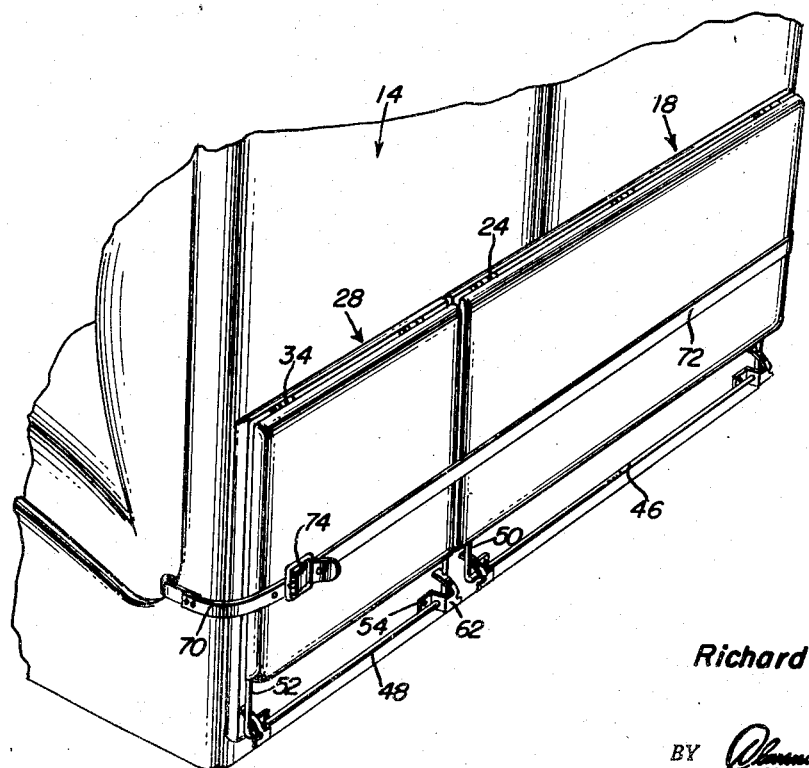
Figure 2 is a perspective view showing the manner in which the play pen assembly is folded and collapsed and secured to the rear portion of the front seat of a motor vehicle.

Essentially this invention embodies a sectional platform or panel construction which in its erected position is adapted to rest upon the rear cushion 16 and extend between the back of the rear seat to the back of the front seat and across the entire width of the car so as to provide as desired a bed, or a playpen for children. It possesses the alternative function of constituting a bed for an adult while providing storage space beneath the bed on the floor of the car. The pen is made in two laterally disposed sections, which as shown in Figure 3 and as suggested in Figure 2, are of different widths. The larger section designated generally by the numeral 18 consists of a pair of panels 20 and 22 which are hinged to each other along adjacent edges as by hinges 24. The panels 20, 22 are of the same width, along their hinged edges, although one of the sections such as that at 22 may have its side edge 26 appropriately inclined with respect to the other edges in order to enable this panel to be sturdily fitted into the space between the sides of the back seat. Preferably, the sections 20 and 22 are of different lengths, so that the section 20 may be disposed in abutment against the rear portion of the front seat 12, and may have its rearward edge or the hinged edge overlying the front portion of the rear seat cushion, with the rear section 22 disposed upon and supported by the rear seat cushion 16.

The bed further includes a second section indicated generally by the numeral 28, which likewise includes a pair of panels 30 and 32, similarly hinged to each other along an adjacent edge as at 34, the panels 30 and 32 being of the same length although of different widths, as the panels 20 and 22 respectively. Likewise the rear panel 32 is provided with an inclined rear edge 36 for the same purpose as the edge 26.

It will now be seen that when both of the sections 18 and 28 are assembled as shown in Figures 1 and 3, the entire space between the rear of the front seat and the front of the back rest of the rear seat is occupied by the horizontally disposed platform, and the interior of the vehicle body is likewise laterally filled. However, it is to be understood that either of the sections 18 or 28 may be used alone when it is desired to occupy only a portion of the interior of the vehicle by the device, thus greatly facilitating the convenience of the occupants of the vehicle.

Obviously, the platform or bed sections 18 and 28 may be of any desired construction, and may be formed of plain plywood if desired; but it is preferred to upholster the same so as to contribute to the appearance and the comfort of its use. For this purpose, as shown best in Figures 4 and 5, a panel of wood or similar material is employed as indicated at 38, which is provided with a cushioning layer 40 which may be of any suitable material such as sponge rubber or the like while the coating or covering 42 of upholstering material of any desired character encloses the layer 40, extends about the edges of the wooden panel 38, and is secured to the undersurface thereof at these edges as by tacks or the like 44.

In order to support the forward end of the larger panels 20 or 30, a novel leg assembly is provided. These legs preferably comprise U-shaped rods or the like having a central portion 46 and 48, which are journaled to the forward edges of the panels 20 and 30, the ends of these central portions having parallel perpendicularly disposed legs 50 and 52 respectively, which are of the proper length to support the front ends of these sections in a horizontal position with the rear ends of the sections resting upon the rear seat cushion. The length of the mid portion is such that the leg portions 50 and 52 will be disposed within the side edges of the panels in the folded position of the device as indicated in Figures 2 and 3.

The leg assemblies are hinged to the undersides of the section panels by a combined leg supporting and locking bracket of the construction shown in Figure 6. This bracket includes a flat plate 54 which is suitably apertured as at 56 for attachment to the undersurface of the panels 20 and 30, adjacent their corners. The bracket further includes a perpendicularly or right angularly disposed portion 58 which is apertured as at 60 to provide a journal through which extends the portions 46 and 48 of the leg assemblies, which are thereby supported for holding or pivotal movement. Finally, the bracket includes a terminal portion 62 which is parallel to and extends oppositely from the portion 54 and at the other end of the portion 58, this latter member including an arcuate portion 64 which upon its outer edge is provided with locking notches or recesses 66 and 68. As indicated in dotted lines in Figure 6, these recesses are adapted to selectively receive the leg portions 52 or 50 of the portions 48 and 46 in their folded or in their erected positions. It is contemplated that there shall be sufficient resiliency in the legs 52 and 50 to enable the same to be slightly bent so that the legs may be withdrawn from the locking sockets and then rotated to other position.

From the foregoing, the construction and operation of the device together with its many advantages will be readily apparent. Obviously, the device can be stored in any suitable manner when not in use. The present invention contemplates a convenient storage arrangement as shown in Figure 2 wherein fastening straps are provided for holding the collapsed sections in a vertical position against the back of the front seat. For this purpose, strap portions 70 and 72 are suitably secured to opposite sides of the front seat, and detachably connected to each other as by a buckle or the like 74 for strapping the folded bed assembly in the position shown.

It is not desired to limit the invention to the exact construction shown and described, but all suitable modifications and equivalents may be resorted to, falling within the scope of the appended claims.

Having described the invention, what is claimed as new is:

1. A foldable automobile bed comprising a substantially rectangular platform consisting of a plurality of sections disposed in side-by-side relation in an automobile, each section being adapted to substantially fill the space between the back of the front seat and the front of the back of the rear seat of an automobile, each section comprising front and rear panels transversely hinged to each other, the rear panel being devoid of legs and adapted to rest upon the seat cushion of the rear seat between the rear seat back and the front edge of the rear seat cushion, foldable legs pivoted to the forward portions of said front panel for supporting the later upon the floor of an automobile.

2. The combination of claim 1 wherein said sections are of equal lengths but of different widths.

3. The combination of claim 1 wherein the foldable legs of each section comprise a U-shaped rod, means journaling the central portion of said rod to the underside and forward portion of the front panel of said section, said last means comprising a pair of brackets secured to said front panel adjacent each of the front corners thereof, the central portion of said rod being journaled in said brackets, locking means on each bracket releasably engageable by an adjacent leg of said U-shaped rod for selectively locking said adjacent leg in erected and folded positions.

4. The combination of claim 1 wherein the foldable legs of each section comprise a U-shaped rod, means journaling the central portion of said rod to the underside and forward portion of the front panel of said section, said last means comprising a pair of brackets secured to said front panel adjacent each of the front corners thereof, the central potrion of said rod being journaled in said brackets, locking means on each bracket releasably engageable by an adjacent leg of said U-shaped rod for selectively locking said adjacent leg in erected and folded positions, said locking means comprising spaced notches in said brackets.

5. The combination of claim 1, wherein the foldable legs of each section comprise a U-shaped rod, means journaling the central portion of said rod to the underside and forward portion of the front panel of said section, said last means comprising a pair of brackets secured to said front panel adjacent each of the front corners thereof, each bracket comprising a member including a central portion and laterally offset end portions, the central portion of said rod being journaled in the central portion of said bracket, one of said end portions including an arcuated projection thereon, said projection having spaced notches therein for selectively locking the adjacent leg in erected and folded positions.

RICHARD J. PIERCE.

References Cited in the file of this patent

UNITED STATES PATENTS

| Number | Name | Date |
|---|---|---|
| 1,188,550 | Meyer | June 27, 1916 |
| 1,233,661 | Gordon | July 17, 1917 |
| 1,333,924 | Kay | Mar. 16, 1920 |
| 1,397,693 | Leonard | Nov. 22, 1921 |
| 1,577,232 | Holly | Mar. 16, 1926 |
| 1,698,601 | Merrill | Jan. 8, 1929 |
| 1,855,857 | Harman | Apr. 26, 1932 |
| 2,357,729 | De Fries | Sept. 5, 1944 |
| 2,583,187 | St. Clair Newbern | Jan. 22, 1952 |

FOREIGN PATENTS

| Number | Country | Date |
|---|---|---|
| 565,659 | Great Britain | Nov. 21, 1944 |

OTHER REFERENCES

Popular Mechanics, article by Bethurum, page 189, September 1951.